H. C. HANSEN, J. A. NORRE & J. A. REIMER.
DRAFT EVENER FOR HARROWS.
APPLICATION FILED AUG. 1, 1916.
1,230,294.
Patented June 19, 1917.
2 SHEETS—SHEET 1.
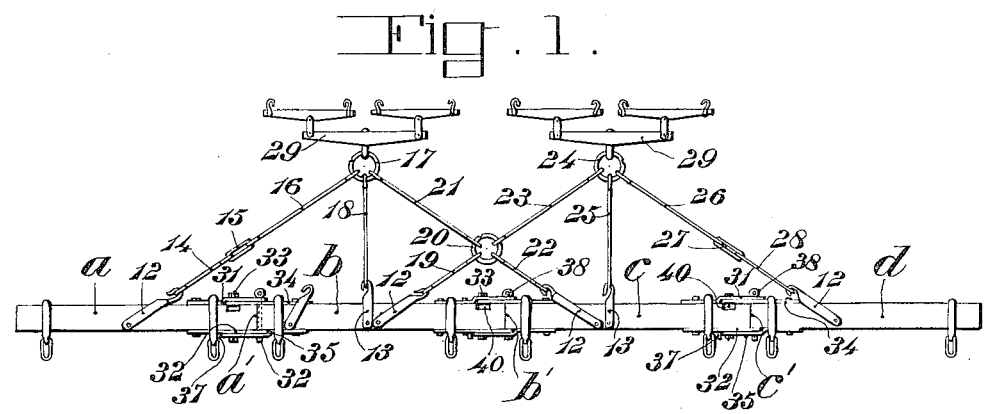
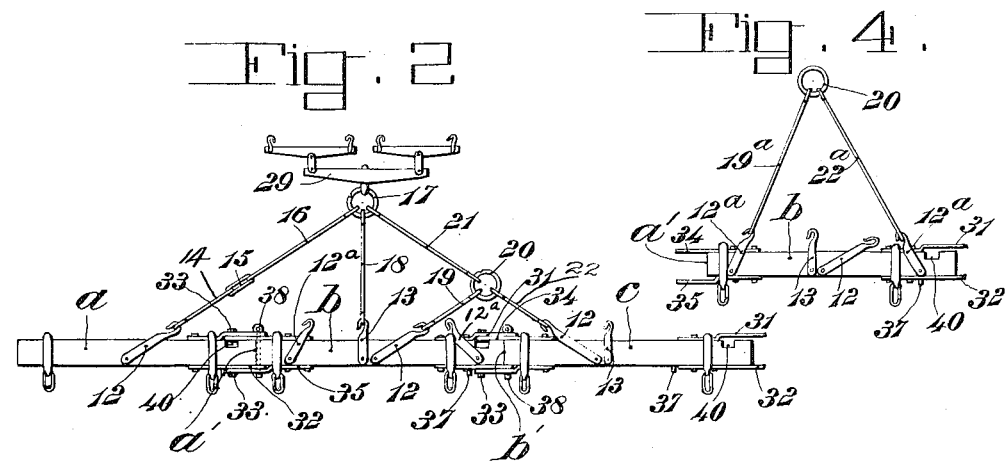
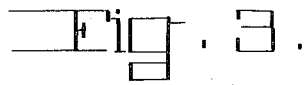
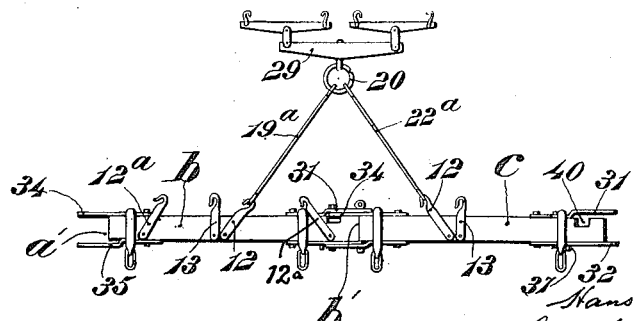
Witness:
Harry King
Inventors:
Hans Christian Hansen,
Jens Andreas Norre,
Jorgen Alfred Reimer,
by Calvert Calvert
Attorneys.

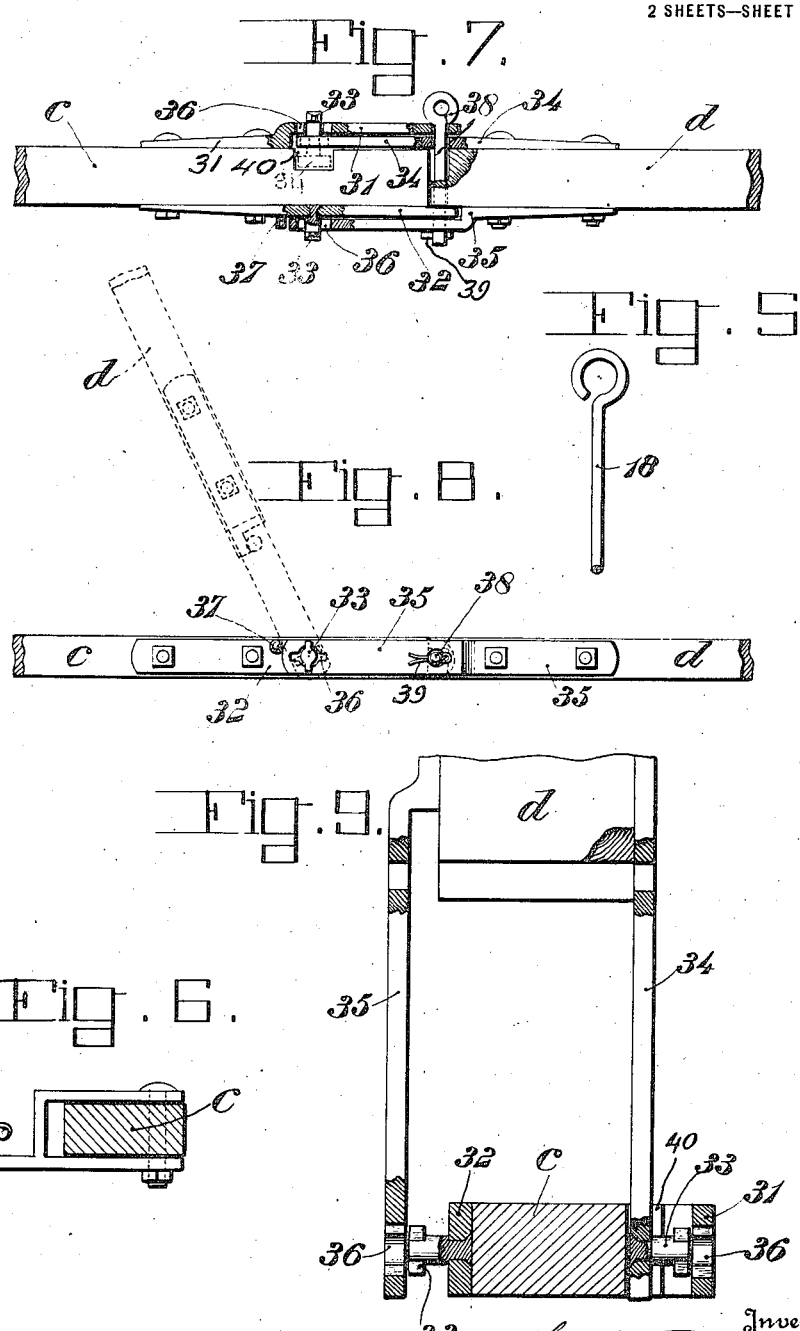

UNITED STATES PATENT OFFICE.

HANS CHRISTIAN HANSEN, JENS ANDREAS NORRE, AND JORGEN ALFRED REIMER, OF ELK HORN, IOWA.

DRAFT-EVENER FOR HARROWS.

1,230,294.   Specification of Letters Patent.   Patented June 19, 1917.

Application filed August 1, 1916. Serial No. 112,625.

*To all whom it may concern:*

Be it known that we, HANS CHRISTIAN HANSEN, a citizen of the United States, and JENS ANDREAS NORRE and JORGEN ALFRED REIMER, both subjects of the King of Denmark, and all residing at Elk Horn, in the county of Shelby and State of Iowa, have invented or discovered certain new and useful Improvements in Draft-Eveners for Harrows, of which the following is a specification, reference being had therein to the accompanying drawings.

This invention relates to draft apparatus for winged harrows, or harrows consisting of several sections which are preferably detachably jointed together, so that in passing through gates or narrow openings the outer sections may be turned up on their hinges, and so that the sections may be readily detached from each other to make the harrow smaller when desired. Harrows of this class, consisting of detachable hinged sections are well known, and the present invention has for its object to provide a draft apparatus consisting of a sectional draw-bar to which the harrow sections are attached, and jointed draft connections to said draw-bar of such a character as to enable the hinged harrow sections to be turned up when desired, and which are also of such a character as will provide for an even draft on either a four, three, two or one section harrow. To this end the draw-bar consists of a plurality of sections detachably jointed together, the joints being provided with means whereby they may be rendered rigid when desired, and the draft connections to the draw-bar comprise rods, links and rings so arranged as to permit the harrow sections to be turned up when desired, and also so arranged that when one or more sections of the draw-bar and the draft connections thereto have been removed the remaining draft connections will provide for an even draft on a three, two or one section harrow. The invention also has for its object to provide such constructions that the parts of the draw-bar and draft connections thereto may be quickly and readily removed or replaced without the use of tools.

In the accompanying drawings Figure 1 is a plan view of the improved draft evener apparatus adapted for use with a four section harrow. Figs. 2, 3 and 4 are similar views of the draft apparatus adapted for use with three, two and one section harrows, respectively. Fig. 5 is a detail view of the hooked end of a draft rod. Fig. 6 is a detail view of one of the clevis hooks attached to the draw-bar. Figs. 7, 8 and 9 are detail views of a preferred form of detachable joint for the sections of the draw-bar.

Referring to the drawings, the draw-bar, in the form of the invention herein shown, comprises four sections *a*, *b*, *c* and *d*, connected by joints, to be hereinafter described, of such a construction as to render the draw-bar rigid when in use, and to permit the joints to be utilized as hinges when desired, and also permitting the sections to be readily disconnected from each other, without the use of tools, when necessary. Attached to the draw-bar, by bolts passing through the same near the rear edge thereof, are a series of clevis hooks 12 and 13, the hooks 13 being disposed at a right angle to the draw-bar and the hooks 12 being inclined with reference thereto. The loops of the inclined clevis hooks are somewhat larger than the loops of the right-angle clevis hooks, so as to properly span the draw-bar.

Connected to a clevis hook 12 on the draw-bar section *a* is a rod 14 connected by a link 15 with a rod 16 which in turn is hooked into a draft ring 17 to which a two-horse whiffletree 29 may be attached; the said ring 17 being connected by a rod 18 with a clevis hook 13 on the draw-bar section *b*. Connected with an inclined clevis hook 12 on the draw-bar section *b* is a rod 19 hooked into a ring 20 and which ring 20 is connected with the draft ring 17 by a rod 21. The ring 20 is also connected by a rod 22 with an inclined clevis hook 12 on the draw-bar section *c* and with a draft ring 24, to which a whiffletree 29 is to be attached, by a rod 23. The draft ring 24 is connected by a rod 25 with a clevis hook 13 on the draw-bar section *c* and is also connected by a rod 26 with a link 27 which is in turn connected by a rod 28 with a clevis hook 12 on the draw-bar section *d*.

It will be noted that the links 15 and 27 and the ring 20 provide joints opposite the several joints of the draw-bar, so that the outer sections of either a four-section or three-section draw-bar may be turned up, when necessary in making the harrow narrow, to pass through a gate or other narrow space.

All of the rods referred to will preferably be provided with open hooks, as shown in Fig. 5, at both ends, for the purpose of rendering them readily detachable from the clevis hooks 12 and 13, the links 15 and 25, and the draft rings 17, 20 and 24, and the said draft rings will preferably be notched or made slightly thinner at one point to facilitate the attachment or detachment of the hooked rods, without making the hook too much open.

A four-section harrow, which may be adapted to be drawn by four horses, as denoted in Fig. 1, may be readily changed to a three-section harrow adapted to be drawn by three horses connected to a whiffletree 29, as shown in Fig. 2, simply by unhooking the rod 23 from the ring 20 and the rods 25 and 26 from the clevis hooks 13 and 12 on the draw-bar sections $c$ and $d$, respectively and then disjointing and removing the draw-bar section $d$. The three-section draw-bar shown in Fig. 2 may be reduced to a two-section draw-bar as shown in Fig. 3, and adapted to be drawn by two horses attached to a whiffletree 29, by removing the draw-bar section $a$, and unhooking the rods 14 and 18 from the clevis hooks 12 and 13 and also unhooking the rod 21 from the ring 20, which now becomes the draft-ring to which the whiffle-tree is attached. If it be desired to give more space between the draft ring 20 and the draw-bar than would be afforded by the rods 19 and 22 somewhat longer rods 19$^a$ and 22$^a$ may be substituted for the rods 19 and 22.

To reduce the two-section draw-bar to a single-section draw-bar, the rods 19 and 22 (or 19$^a$ and 22$^a$) may be unhooked from the clevis hooks 12 on the sections $b$ and $c$, the section $c$ may be disjointed from the section $b$ and the said rods may then be hooked into clevis hooks 12$^a$ on the section $b$, thus arranging the parts as shown in Fig. 4, and providing a single draw-bar section adapted to be drawn by either one or two horses hitched to a whiffletree which may be connected with the draft ring 20. In all of these arrangements or adjustments of the draft-rods, from a four-section to a one-section harrow, there will be an even or balanced draft on the harrow draw-bar, as will be obvious.

Each of the joints of the draw-bar is preferably formed as shown in detail in Figs. 7, 8 and 9. Bolted to a draw-bar section, as $c$, are two plates 31 and 32. Fixed to the plate 32 is a pin 33 having a head preferably comprising side wings or projections. The plate 31 has an offset or bent-out part forming a space for the reception of a portion of a plate 34 bolted to a draw-bar section, as $d$, and to which draw-bar section is bolted a plate 35 having a bent-out or offset part overlapping one end of the plate 32. The plate 34 is provided near its end with a pin 33 like that on the plate 32, and the plates 31 and 32 are provided with slots 36 which will permit the passage of the winged heads of the pins 33 when the parts are properly disposed. The pins 33 afford a joint or pivot permitting the draw-bar section $d$ to be turned up, as denoted in dotted lines in Fig. 8, and when in this position a pin 37, fixed to the plate 32, will serve as a stop to limit the inwardly tilting movement of the draw-bar section $d$, such movement being also limited by the contact of a shoulder on the plate 31 with the plate 34, near the end of the latter.

When the draw-bar is in use each of the joints connecting the sections of the same will be rendered rigid by means of a locking pin 38 passing through all of the plates 31, 32, 34 and 35, the ends of which overlap each other, and held in place by means of a cotter pin 39. When the locking pin 38 has been taken out and the draw-bar section $d$ is turned up perpendicularly, so that the slots 36 in the plates 31 and 35 are brought into register with the winged heads of the pins 33, the draw-bar section $d$ may be disconnected, as shown in Fig. 9, from the draw-bar section $c$ by a lateral movement of such draw-bar section; the end of the plate 34, carrying a pin 33, being, in such lateral movement, received in a recess 40 formed in the draw-bar section $c$.

It will thus be understood that the draw-bar sections may be disjointed from each other without the use of tools, and it will also be understood that, owing to the fact that the draft rods are all provided with open hooks, said draft-rods may be readily detached from the clevis hooks on the draw-bar sections and also from the links 15 and 27 and the draft rings 17 and 24, in reducing the four-section draw-bar to a three, two, or a single section bar, without the use of tools; and it will likewise be understood that the parts may be readily connected together, in increasing the sections of the draw-bar, quickly and without the use of tools.

Having thus described our invention we claim and desire to secure by Letters Patent:

1. A harrow draw-bar consisting of a plurality of sections pivotally connected together by detachable joints, combined with means for rendering said joints rigid when desired, said draw-bar being provided with a series of clevis hooks some of which are at a right angle to the draw-bar, and others of which are inclined relative to said draw-bar, combined with a series of draft rods having jointed connections opposite each of said joints, two draft rings connected by said rods with said clevis hooks on said draw-bar, and a third draft ring disposed between the said two draft rings and also connected with certain of said clevis hooks; said draft rods being all disconnectible from said draft rings and clevis hooks; whereby a four-section draw-bar may be reduced to a three, two, or one-section draw-bar quickly and readily and without the use of tools, and without disturbing the evenness or balance of the draft.

2. A harrow draw-bar consisting of a plurality of sections attached together by disconnectible joints each of which comprises two plates fixed to the adjacent ends of two draw-bar sections, said plates overlapping each other and being pivotally connected, and a locking pin passing through all of said plates and serving to render the joint rigid when desired, one of said plates being provided with a pin having a winged head, and the other of said plates being provided with a slot through which said winged head may pass so that when said locking pin is removed one harrow section may be disjointed from another by a lateral movement of one harrow section relative to the other.

In testimony whereof we affix our signatures.

HANS CHRISTIAN HANSEN.
JENS ANDREAS NORRE.
JORGEN ALFRED REIMER.